US011907008B2

(12) United States Patent
Niitsuma

(10) Patent No.: US 11,907,008 B2
(45) Date of Patent: Feb. 20, 2024

(54) COMMUNICATION APPARATUS AND CONTROL METHOD THEREOF

(71) Applicant: CANON KABUSHIKI KAISHA, Tokyo (JP)

(72) Inventor: Hiroaki Niitsuma, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 68 days.

(21) Appl. No.: 17/678,577

(22) Filed: Feb. 23, 2022

(65) Prior Publication Data
US 2022/0283604 A1 Sep. 8, 2022

(30) Foreign Application Priority Data

Mar. 3, 2021 (JP) ................. 2021-033659

(51) Int. Cl.
G06F 1/10 (2006.01)
G06F 13/42 (2006.01)

(52) U.S. Cl.
CPC ............ *G06F 1/10* (2013.01); *G06F 13/4221* (2013.01); *G06F 2213/0026* (2013.01)

(58) Field of Classification Search
CPC ...... G06F 1/10; G06F 1/3237; G06F 13/4221; G06F 2213/0026; G06F 1/325
See application file for complete search history.

(56) References Cited

U.S. PATENT DOCUMENTS

| 6,546,496 B1* | 4/2003 | Wang .................... G06F 1/3237 713/322 |
| 2002/0199026 A1* | 12/2002 | Tsunashima .......... G06F 1/3203 709/250 |
| 2003/0167416 A1* | 9/2003 | Nakatsuhama ....... G06F 1/3209 713/400 |
| 2005/0188232 A1* | 8/2005 | Weng .................... G06F 1/3287 713/320 |

(Continued)

FOREIGN PATENT DOCUMENTS

| JP | 2013126022 A | * 6/2013 |
| JP | 2016213703 A | 12/2016 |

OTHER PUBLICATIONS

Machine-generated translation of JP 2013126022A (Year: 2013).*

*Primary Examiner* — Glenn A. Auve
(74) *Attorney, Agent, or Firm* — Canon U.S.A., Inc. IP Division

(57) ABSTRACT

A communication apparatus includes a communication circuit, a clock supply circuit, a CPU and a memory storing a program which, when executed by the CPU, causes the communication apparatus to function as a control unit which causes the communication circuit to operate in one of a first mode in which the communication circuit performs a normal communication with the external apparatus and a second mode in which the communication circuit operates with lower power consumption than in the first mode. In the second mode, the control unit controls the clock supply circuit so as not to supply the clock signal to the commu- (Continued)

nication circuit. While the communication circuit is operating in the second mode and the clock signal is not being supplied to the communication circuit, the control unit controls the clock supply circuit to start supply of the clock signal to the communication circuit in response to a predetermined signal.

9 Claims, 7 Drawing Sheets

(56) References Cited

U.S. PATENT DOCUMENTS

| | | | | |
|---|---|---|---|---|
| 2010/0191979 | A1* | 7/2010 | Zipperer | G06F 9/4812 |
| | | | | 713/300 |
| 2010/0246380 | A1* | 9/2010 | Bando | G06F 1/3284 |
| | | | | 370/216 |
| 2013/0067258 | A1* | 3/2013 | Furuya | G06F 1/3237 |
| | | | | 713/322 |
| 2016/0109928 | A1* | 4/2016 | He | G06F 1/3293 |
| | | | | 710/14 |
| 2016/0337540 | A1* | 11/2016 | Fujisawa | H04N 1/33323 |
| 2019/0041936 | A1* | 2/2019 | Teoh | G06F 1/266 |
| 2019/0115827 | A1 | 4/2019 | Niitsuma | |
| 2019/0340146 | A1* | 11/2019 | Chen | H03K 5/2481 |
| 2020/0250125 | A1 | 8/2020 | Yoshihara et al. | |
| 2021/0360118 | A1* | 11/2021 | Otsuki | H04N 1/00896 |

* cited by examiner

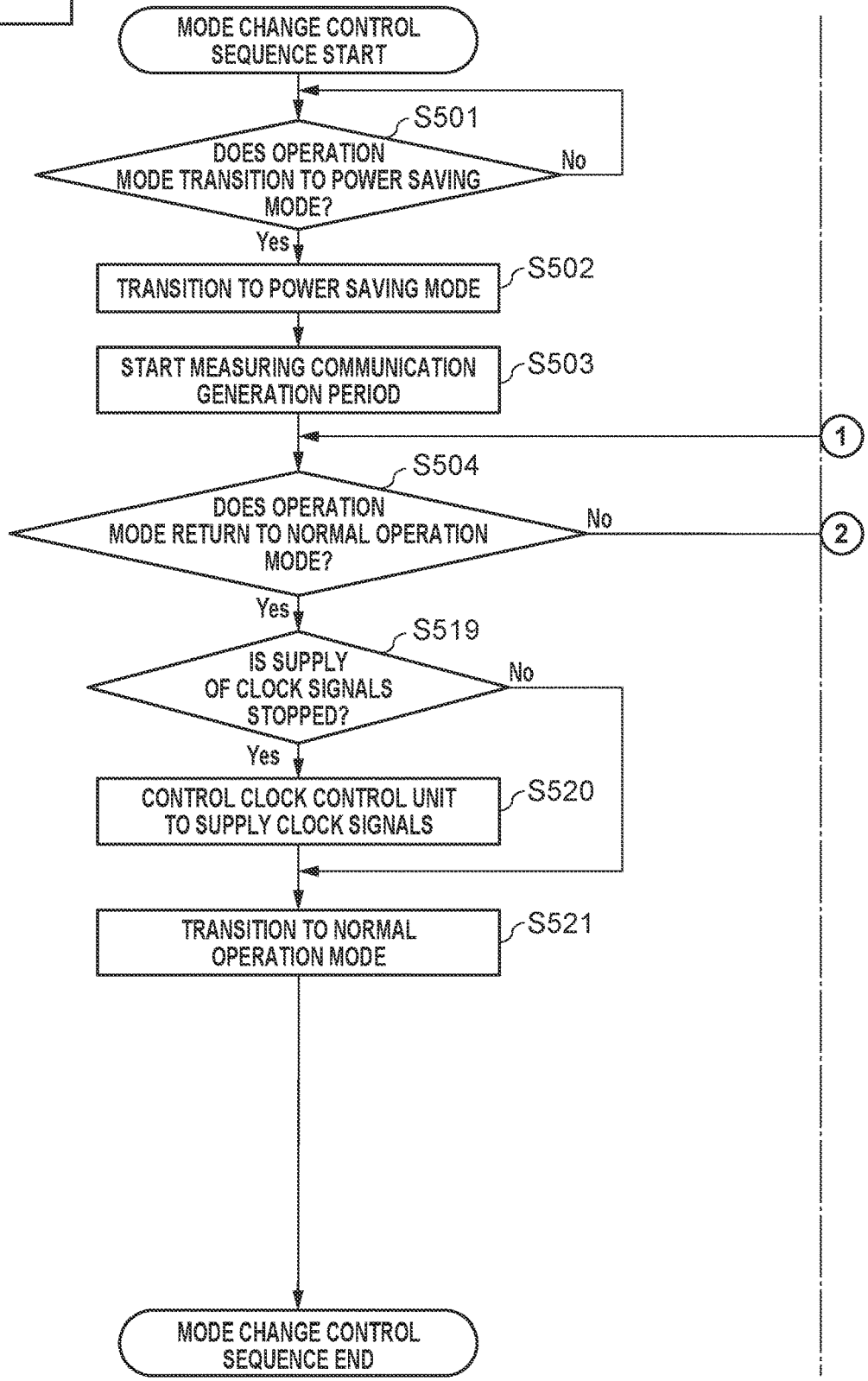

COMMUNICATION APPARATUS AND CONTROL METHOD THEREOF

BACKGROUND

Field of the Disclosure

Aspects of the present disclosure generally relate to a communication apparatus and a control method of the communication apparatus.

Description of the Related Art

Among communication apparatuses including the function of data communication with an external apparatus or a small device, a known communication apparatus includes a communication unit having a normal operation mode in which data communication is enabled and a power saving mode in which the communication unit operates with lower power consumption than in the normal operation mode so that power consumption in the communication unit can be reduced (Japanese Patent Application Laid-Open No. 2016-213703).

Japanese Patent Application Laid-Open No. 2016-213703 discusses a technique for mode switching control to switch between the normal operation mode and the power saving mode. However, this technique does not take into consideration a method for further reducing power consumption when the communication apparatus operates in the power saving mode.

SUMMARY

According to various embodiments, there is provided a communication apparatus that includes a communication circuit which operates to communicate with an external apparatus, a clock supply circuit, a CPU, and a memory storing a program which, when executed by the CPU, causes the communication apparatus to function as a control unit configured to cause the communication circuit to operate in any one of a plurality of modes including a first mode and a second mode. The first mode is a mode in which the communication circuit performs a normal communication with the external apparatus, and the second mode is a mode in which the communication circuit operates with lower power consumption than in the first mode. In a case where the communication circuit operates in the second mode, the control unit controls the clock supply circuit so as not to supply a clock signal to the communication circuit. Further, while the communication circuit is operating in the second mode and the clock signal is not being supplied to the communication circuit, the control unit controls the clock supply circuit to start supply of the clock signal to the communication circuit in response to receiving a predetermined signal.

According to various embodiments, there is provided a method causing a communication unit of a communication apparatus to operate in any one of a plurality of modes including a first mode and a second mode. The first operation mode is a mode in which the communication unit performs a normal communication with an external apparatus, and the second mode is a mode in which the communication unit operates with lower power consumption than in the first mode. The method further includes controlling, in a case where the communication unit operates in the second operation mode, a supply unit of the communication apparatus so as not to supply a clock signal to the communication unit, and controlling the supply unit to start supply of the clock signal to the communication unit in response to receiving a predetermined signal while the communication unit is operating in the second mode and the clock signal is not being supplied to the communication unit.

Further aspects of the disclosure will become apparent from the following description of example embodiments.

DESCRIPTION OF THE EMBODIMENTS

Example embodiments, features, and aspects of the disclosure will be described below with reference to the drawings. However, embodiments of the invention are not limited to the following example embodiments.

Figure 1:
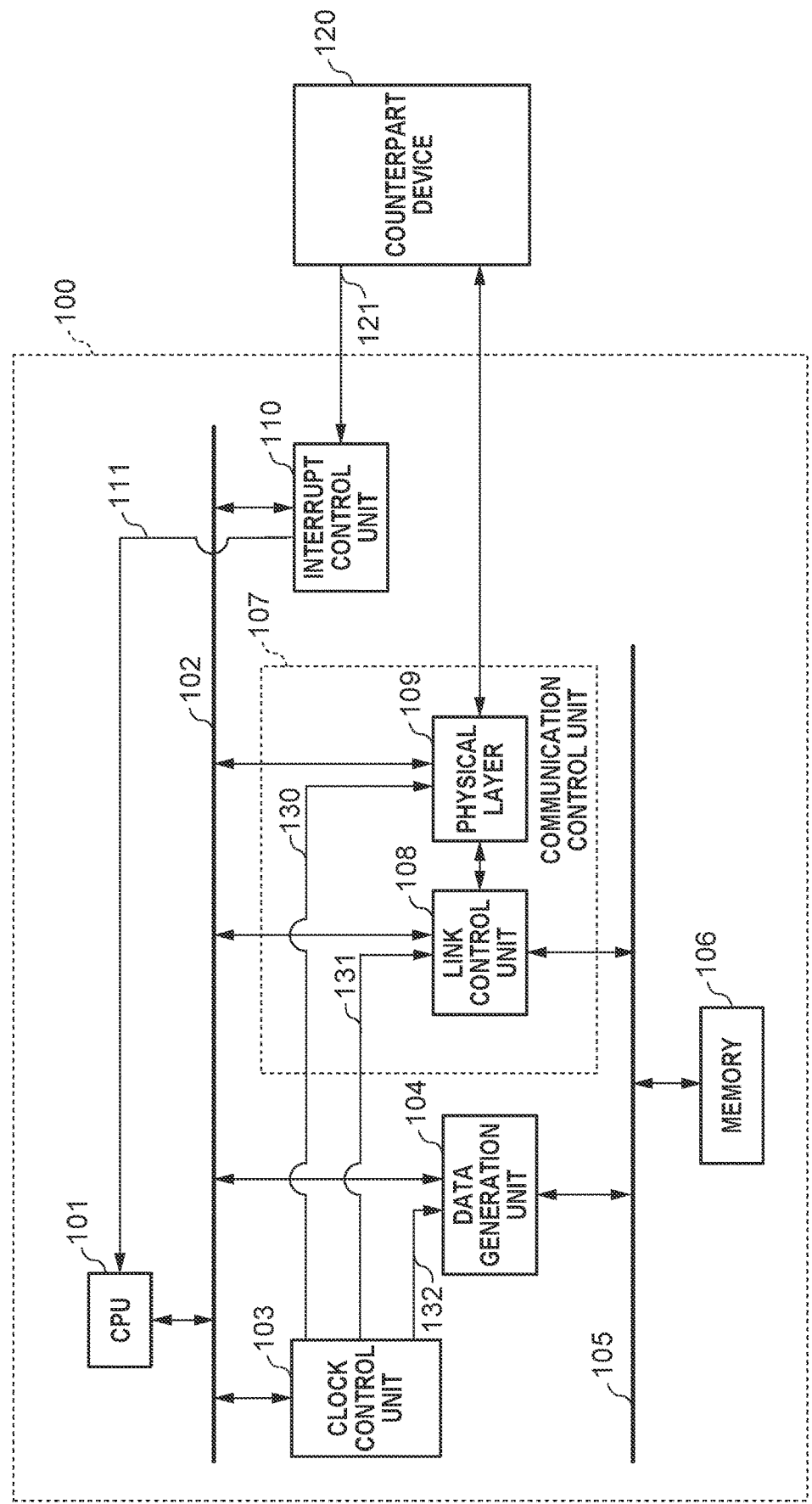
FIG. 1 is a block diagram illustrating a configuration example of a communication apparatus according to a first example embodiment.

FIG. 1 is a block diagram illustrating a configuration example of a communication apparatus 100 according to a first example embodiment. The communication apparatus 100 includes a central processing unit (CPU) 101, a CPU bus 102, a clock control unit 103, a data generation unit 104, a memory bus 105, a memory 106, a communication control unit 107, and an interrupt control unit 110. The communication apparatus 100 communicates data with a counterpart device 120 via the communication control unit 107. Power is supplied to each functional block from a power source circuit (not shown).

The CPU 101 is a control unit that controls the functions of functional blocks included in the communication apparatus 100 via the CPU bus 102. The CPU 101 includes an interrupt port that receives a notification for starting predetermined interrupt processing for a system program.

The CPU bus 102 is a bus for communicating instructions between the CPU 101 and the functional blocks.

The clock control unit 103 includes a hardware circuit having a function of a supply unit that supplies a clock signal with a predetermined frequency to each functional block of the communication apparatus 100. The clock control unit 103 can control supplying and stopping of the clock signal to each functional block in response to an instruction from the CPU 101. If the supply of the clock signal to a functional block that is not in use is stopped, power consumption of the functional block due to the oscillation of the clock signal can be reduced.

In a normal operation mode in which normal data communication is performed, a physical layer 109, a link control unit 108, and the data generation unit 104 each operate in response to receiving clock signals 130, 131, and 132, respectively, that are supplied from the clock control unit 103, thus communicating data with the counterpart device 120. On the other hand, in a power saving mode in which power consumption is reduced in the communication apparatus 100, the supply of the clock signals 130, 131, and 132 to the physical layer 109, the link control unit 108, and the data generation unit 104, respectively, is stopped, thus further reducing power consumption in the communication apparatus 100.

The clock signal 130 is supplied to the physical layer 109. The clock signal 131 is supplied to the link control unit 108. The clock signal 132 is supplied to the data generation unit 104.

The data generation unit 104 includes for the function of generating communication data for the counterpart device 120 connected to the communication apparatus 100.

The memory bus 105 is a bus for connecting each functional block to the memory 106, and also includes a memory controller function of controlling the memory 106 in the first example embodiment.

The memory 106 is a storage device including a dynamic random access memory (DRAM) and the like. The memory 106 temporarily stores data processed by each functional block, and also stores system programs to be executed by the CPU 101.

The communication control unit 107 includes a hardware circuit having the function of controlling communication functions of the communication apparatus 100, and includes, for example, the link control unit 108 and the physical layer 109.

The link control unit 108 includes a direct memory access (DMA) controller (not illustrated), and communicate data with the memory 106 and the physical layer 109 (described below) via the memory bus 105. For example, the link control unit 108 assigns and checks cyclic redundancy check (CRC) data for data to be transmitted and received, checks data packet loss, and performs retry control if a data transfer error occurs.

The physical layer 109 includes a phase-locked loop (PLL) which is an analog circuit that performs high-frequency oscillation control, and a Serializer/Deserializer (SerDes) circuit that performs conversion between serial and parallel data. The physical layer 109 further includes a clock data recovery (CDR) circuit that recovers a clock signal based on high-speed serial data. The physical layer 109 receives not only the clock signal 130 to be described below, but also a reference clock signal (not illustrated) for the above-described PLL. The physical layer 109 exchanges signals with the counterpart device 120 by differential transmission of high-speed serial data.

The communication control unit 107 operates in an operation mode set from among a plurality of operation modes including the normal operation mode in which normal data communication is performed and the power saving mode in which power consumption is reduced by shifting differential signals through transmission paths into an idle state. The communication control unit 107 controls the differential transmission of high-speed serial data on the physical layer 109 depending on the set operation mode. In the power saving mode, the link control unit 108 shifts the differential signals through the transmission paths into an operating state at a predetermined time interval, and temporarily communicates with the counterpart device 120.

The interrupt control unit 110 is connected to the interrupt port included in the CPU 101 via an interrupt signal 111. The interrupt control unit 110 is a reception unit that receives an interrupt signal 121 from the counterpart device 120 (described below) and detects an interrupt from the counterpart device 120. Upon detection of the interrupt, the interrupt control unit 110 outputs the interrupt signal 111 to the CPU 101 to notify the CPU 101 of the interrupt from the counterpart device 120.

The counterpart device 120 is a communication device that is connected to the physical layer 109 of the communication apparatus 100, and uses a communication protocol that is commonly used for high-speed serial data transfer and is included in the communication apparatus 100. The counterpart device 120 includes a single-ended signal input/output port such as a general-purpose input/output (GPIO), and causes the CPU 101 to generate an interrupt via the interrupt signal 121 with an output potential at the input/output port. The interrupt signal 121 is a signal whose potential varies only when a notification about the interrupt is transmitted to the CPU 101 from the counterpart device 120, and consumes less power than in high-speed serial data transmission between the physical layer 109 and the counterpart device 120.

Next, control processing for changing an operation mode in the communication control unit 107 of the communication apparatus 100 will be described with reference to the flowchart illustrated in FIG. 2. The flowchart illustrated in FIG. 2 is a mode change control sequence of changing the operation mode between the normal operation mode in which normal data communication is performed and the power saving mode in which power consumption is reduced by shifting differential signals through transmission paths into the idle state, in high-speed serial data communication between the communication apparatus 100 and the counterpart device 120.

Figure 2:
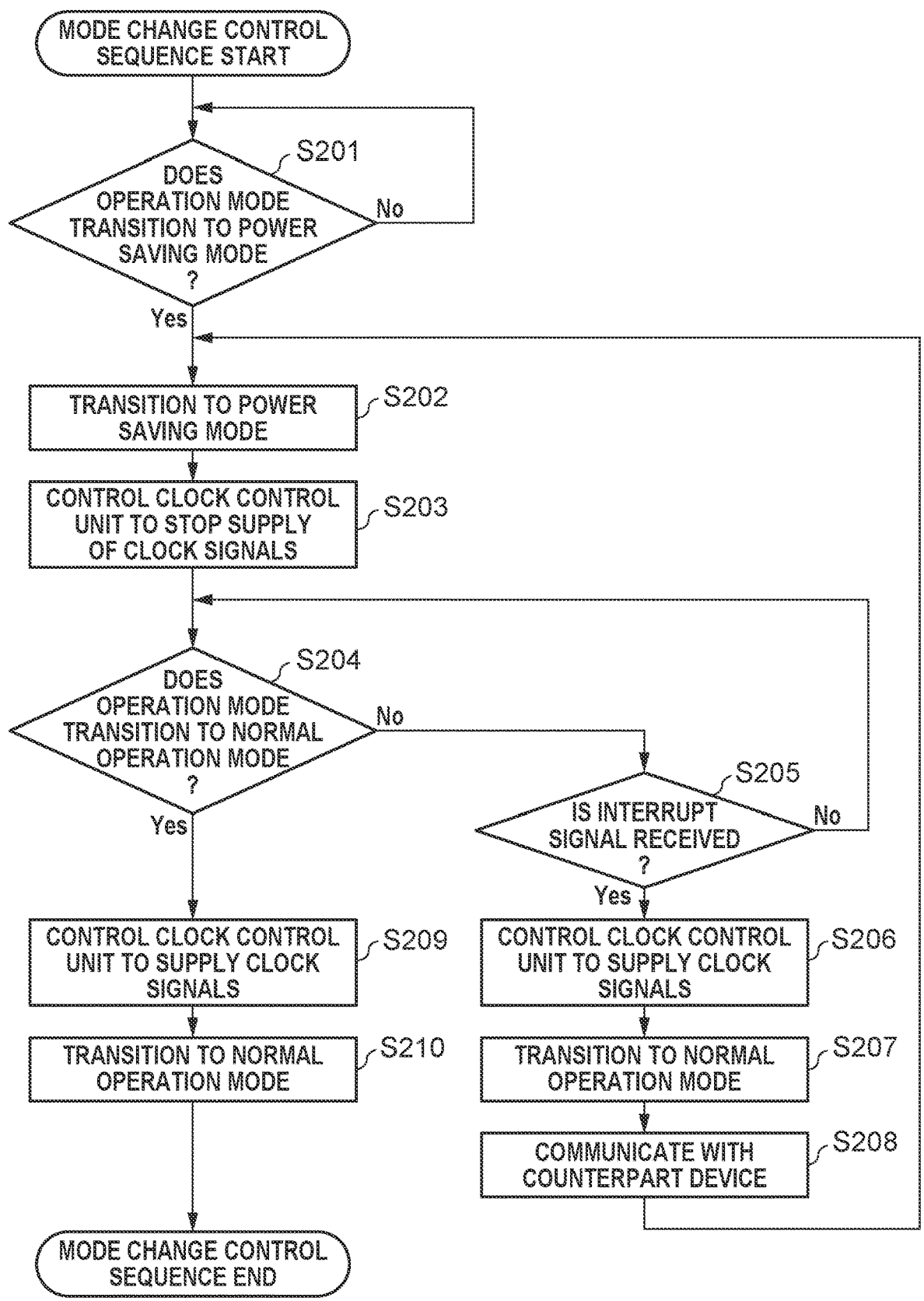
FIG. 2 is a flowchart illustrating a sequence of operations for changing an operation mode of a communication control unit according to one example embodiment.

The processing in the flowchart illustrated in FIG. 2 is implemented by hardware modules included in the communication control unit 107 of the communication apparatus 100 being controlled and by the CPU 101 executing the processing in accordance with system programs stored in the memory 106. Assume that the mode change control sequence is executed in a case where the communication control unit 107 operates in the normal operation mode.

In step S201, the CPU 101 determines whether to transition to the power saving mode. For example, in a case where valid data communication between the communication control unit 107 and the counterpart device 120 has not been performed for a predetermined period of time, the CPU 101 determines that there is no need for constant communication and thus determines that the operation mode is to transition to the power saving mode.

If the CPU 101 determines that the operation mode is to transition to the power saving mode (YES in step S201), the CPU 101 issues an instruction to transition to the power saving mode to the communication control unit 107, and the processing proceeds to step S202. If the CPU 101 determines that the operation mode is not to transition to the power saving mode (NO in step S201), the communication control unit 107 operates in the normal operation mode to continue data communication with the counterpart device 120, and repeatedly performs the determination process in step S201.

In step S202, the communication control unit 107 transitions to the power saving mode. The link control unit 108 notifies the counterpart device 120 of the transition of the communication state to the power saving mode, and shifts the transmission path between the physical layer 109 and the counterpart device 120 into the idle state for power saving.

After the communication control unit 107 transitions to the power saving mode, in step S203, the CPU 101 controls the clock control unit 103 to stop the supply of the clock signals 130 and 131 to the physical layer 109 and the link control unit 108, respectively. Thus, in a state where the communication control unit 107 operates in the power saving mode, the supply of the clock signals 130 and 131 to the physical layer 109 and the link control unit 108, respectively, is stopped. This enhances the effect of reducing power consumption in the communication apparatus 100.

In step S204, the CPU 101 determines whether to transition to the normal operation mode. For example, if a task for transmitting data to the counterpart device 120 is generated in the communication apparatus 100, or if a task for which it is predicted that data can be transmitted to the counterpart device 120 is generated, the CPU 101 determines that the operation mode is to transition to the normal operation mode. If the CPU 101 determines that the operation mode is to transition to the normal operation mode (YES in step S204), the processing proceeds to step S209. If the CPU 101 determines that the operation mode is not to transition to the normal operation mode (NO in step S204), the processing proceeds to step S205.

In step S205, the CPU 101 determines whether the interrupt signal 111 generated due to the interrupt signal 121 of the counterpart device 120 has been received from the interrupt control unit 110.

If the communication control unit 107 of the communication apparatus 100 operates in the power saving mode, the counterpart device 120 cannot immediately execute high-speed serial data communication with the communication apparatus 100. Thus, in a case where the counterpart device 120 communicates with the communication apparatus 100 that is operating in the power saving mode, the counterpart device 120 outputs the interrupt signal 121 and notifies the CPU 101 in the communication apparatus 100 of the occurrence of communication. The CPU 101 starts control processing to cause the operation mode of the communication control unit 107 to transition to the normal operation mode in response to detecting that the interrupt signal is received.

In step S205, if the CPU 101 determines that the interrupt signal 111 is received (YES in step S205), the processing proceeds to step S206 so that the CPU 101 executes interrupt processing for responding to the communication which is caused by the counterpart device 120. In step S205, if the CPU 101 determines that the interrupt signal 111 has not been received (NO in step S205), the processing returns to step S204.

In step S206, the CPU 101 controls the clock control unit 103 to supply the physical layer 109 and the link control unit 108 with the clock signals 130 and 131, respectively. The processing proceeds to step S207.

In step S207, the link control unit 108 that is supplied with the clock signal 131 controls the transition to the normal operation mode. The processing proceeds to step S208.

After communication control unit 107 completes the transition to the normal operation mode and high-speed serial data communication between the physical layer 109, in response to the counterpart device 120 being enabled, in step S208, the CPU 101 of the communication apparatus 100 communicates with the counterpart device 120. In response to completion of the communication between the communication apparatus 100 and the counterpart device 120, the processing returns to step S202. In step S202, the CPU 101 controls the communication control unit 107 to transition to the power saving mode again. In other words, in response to completion of the communication caused by the interrupt signal 121 output from the counterpart device 120, the operation mode of the communication control unit 107 returns to the power saving mode.

Through the control processing described above, in a case where communication occurs in response to a request from the counterpart device 120 in the power saving mode, the sequence in which the operations in steps S205 to S208 are executed and then the processing returns to step S202 is executed. The supply of clock signals can be resumed for a required period of time and the supply of clock signals can be stopped in the other periods of time. This enhances the effect of reducing power consumption. Through the control processing described above, for example, in a case where the above-described communication with the counterpart device 120 repeatedly occurs at a predetermined time interval, there is no need to continuously supply clock signals to the physical layer 109 and the link control unit 108 during the operation in the power saving mode in preparation for communication that repeatedly occurs. Consequently, it is possible to respond to a communication in response to a request from the counterpart device 120, while reducing power consumption in the communication apparatus 100 in the power saving mode.

In step S204, if the CPU 101 determines that the operation mode transitions to the normal operation mode (YES in step S204), the processing proceeds to step S209. In step S209, the CPU 101 controls the clock control unit 103 to supply the physical layer 109 and the link control unit 108 with the clock signals 130 and 131, respectively.

In step S210, the link control unit 108 performs control processing to transition to the normal operation mode in response to an instruction to return to the normal operation mode from the CPU 101. The link control unit 108 sends a notification that the communication state is returned to the normal operation mode to the counterpart device 120, thus resuming the high-speed serial data communication between the physical layer 109 and the counterpart device 120. Thus, the mode change control sequence is completed. The mode change control sequence is immediately resumed and repeated during the period in which the communication apparatus 100 operates in the normal operation mode.

According to the control processing of the first example embodiment, the communication apparatus 100 stops supply clock signals to unnecessary function blocks in the power saving mode in which communication is not performed, thus further reducing power consumption. Further, the communication can be performed in a state where the communication between the communication apparatus 100 and the counterpart device 120 is enabled by supplying a clock signal to the communication control unit 107 in response to the interrupt signal 121 that has been output at a predetermining timing when the counterpart device 120 performs communication.

While the first example embodiment illustrates a typical configuration for high-speed serial data communication, the configuration according to the first example embodiment is not limited only to specific communication protocols and communication standards. For example, the first example embodiment may be applied to communication based on a Peripheral Component Interconnect Express (PCIe) standard. For example, Institute of Electrical and Electronics Engineers (IEEE) 802.3az developed by the IEEE is a power saving network technique for reducing power during an idle time when no data is transmitted or received via Ethernet®. The communication control unit 107 may be a high-speed serial interface based on the PCIe standard developed by the Peripheral Component Interconnect Special Interest Group (PCI-SIG). For example, the PCIe standard developed by the PCI-SIG has a plurality of power saving modes, including a normal operation mode in which data transfer in a state called an L0 state is enabled and a power saving mode in which data transfer in a state called an L1 state is enabled.

A second example embodiment will be described below. The second example embodiment illustrates an example where a communication apparatus 300 autonomously supplies a clock signal at a predetermined timing during operation in the power saving mode. In the communication apparatus 300, the interrupt signal 121 supplied from the counterpart device 120 and the interrupt control unit 110 in the communication apparatus 100 according to the first example embodiment can be omitted.

Figure 3:
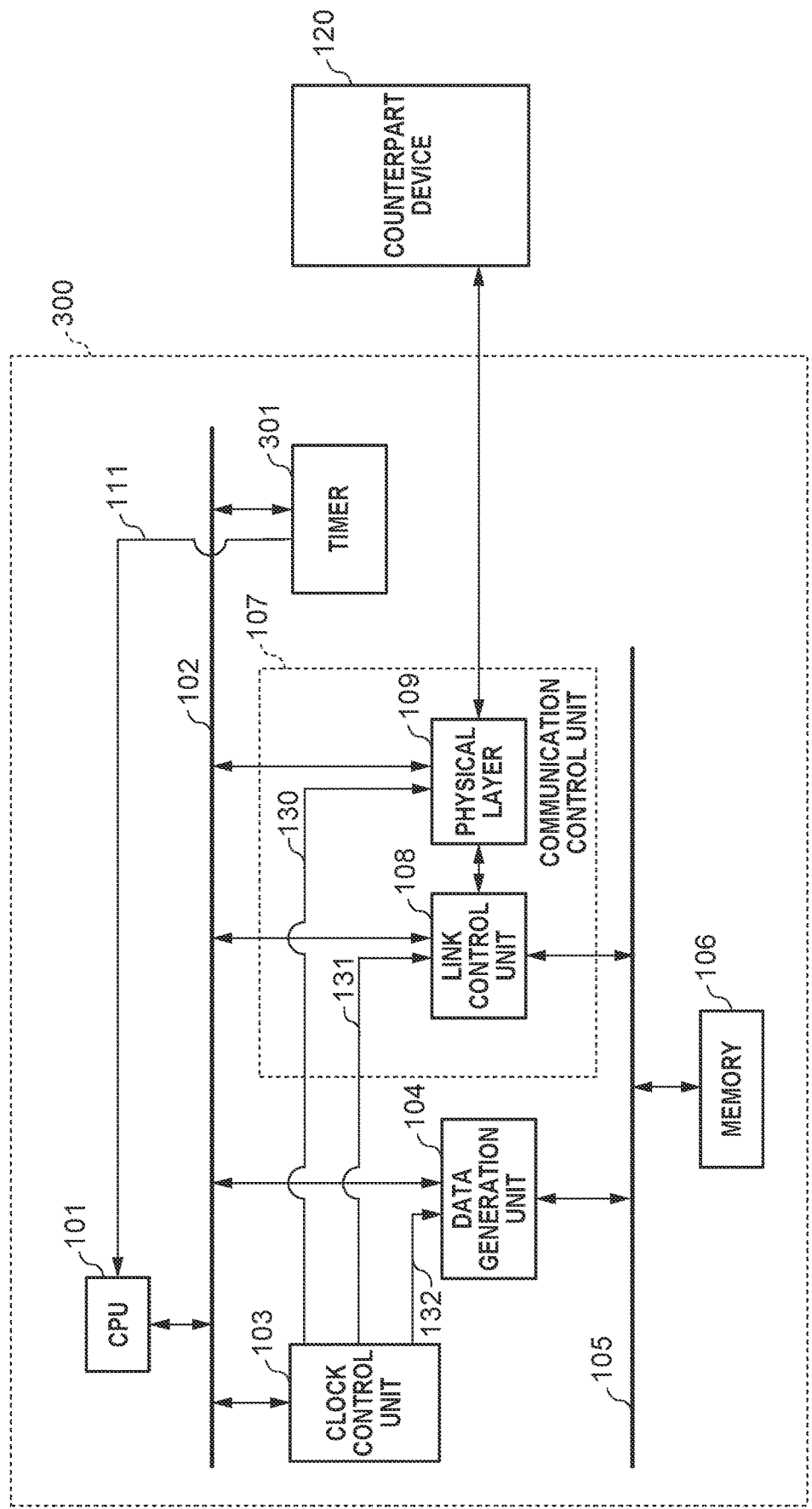
FIG. 3 is a block diagram illustrating a configuration example of a communication apparatus according to a second example embodiment.

FIG. 3 is a block diagram illustrating a configuration example of the communication apparatus 300 according to the second example embodiment. The communication apparatus 300 includes the CPU 101, the CPU bus 102, the clock control unit 103, the data generation unit 104, the memory bus 105, the memory 106, and the communication control unit 107. The communication apparatus 300 further includes a timer 301. The components of the communication apparatus 300 that have functions similar to those of the communication apparatus 100 according to the first example embodiment are denoted by the same reference numerals, and the descriptions thereof are omitted. Only differences between the communication apparatus 300 and the communication apparatus 100 will be described.

The timer 301 is a measurement unit that outputs the interrupt signal 111 to the interrupt port included in the CPU 101. The timer 301 includes the function of measuring time. The timer 301 is configured to start and stop the measurement under control of the CPU 101, and to read out the measured time. The timer 301 is also configured to output the interrupt signal 111 upon lapse of a return period set by the CPU 101, and to notify the CPU 101 of a lapse of a set predetermined time.

Figure 4:
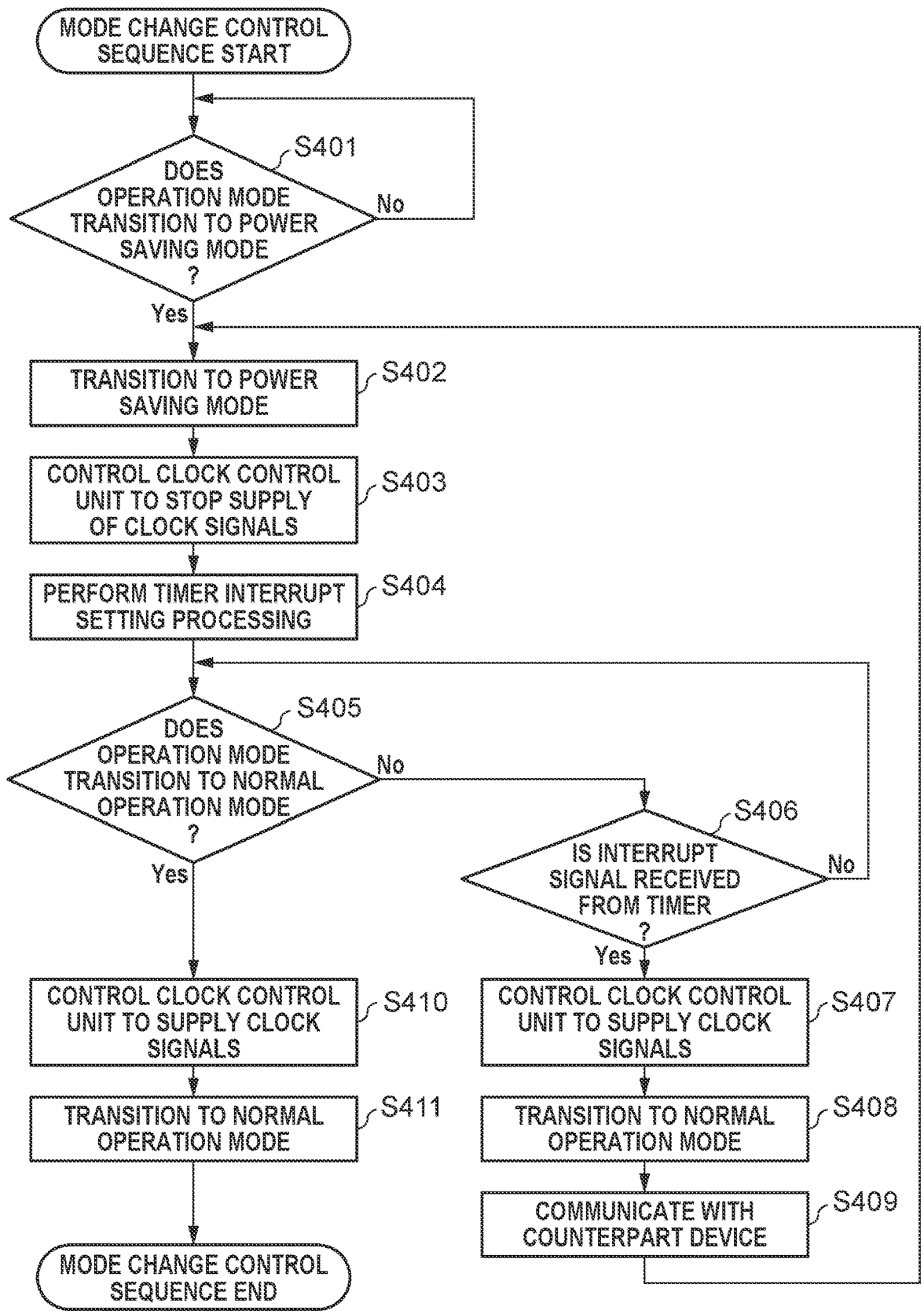
FIG. 4 is a flowchart illustrating the sequence of operations for changing an operation mode of the communication control unit according to one example embodiment.

FIG. 4 is a flowchart illustrating a mode change control sequence to be executed by the communication apparatus 300. The mode change control sequence is repeatedly executed when the communication apparatus 300 operates in the normal operation mode in which normal data communication is performed in high-speed serial data communication between the physical layer 109 of the communication apparatus 300 and the counterpart device 120. The mode change control sequence is a sequence in which the operation mode transitions from the normal operation mode to the power saving mode for reducing power consumption by shifting differential signals through transmission paths into an idle state, and then the operation mode is returned to the normal operation mode.

The mode change control sequence is implemented by hardware modules included in the communication control unit 107 of the communication apparatus 300 being controlled and by the CPU 101 executing the processing based on system programs stored in the memory 106. The mode change control sequence to be executed by the communication apparatus 300 differs from the mode change control sequence to be executed by the communication apparatus 100 in that an interrupt setting process by the timer 301 (step S404) and an interrupt process from the timer 301 (step S406) are added.

In step S401, the CPU 101 determines whether to transition to the power saving mode. For example, in a case where valid data communication between the communication control unit 107 and the counterpart device 120 has not occurred for a predetermined period of time, the CPU 101 determines that there is no need for constant communication and thus determines that the operation mode is to transition to the power saving mode. The operation in step S401 is a determination process which is similar to the operation in step S201.

In step S402, the link control unit 108 performs control processing to transition to the power saving mode. The link control unit 108 sends a notification, to the counterpart device 120, that the communication state is to transition to the power saving mode, and shifts the transmission path between the physical layer 109 and the counterpart device 120 into the idle state for power saving. The operation in step S402 is similar to the operation in step S202.

In step S403, the CPU 101 controls the clock control unit 103 to stop the supply of the clock signals 130 and 131 to the physical layer 109 and the link control unit 108, respectively. The operation in step S403 is similar to the operation in step S203.

In step S404, the CPU 101 controls the timer 301 to start the measurement by the timer 301. As described below, the CPU 101 sets a return period for the communication apparatus 300 to temporarily return to the normal operation mode from the power saving mode in the timer 301. In this case, the return period corresponds to a period in which the counterpart device 120 generates high-speed serial data communication with the physical layer 109.

In step S405, the CPU 101 determines whether to transition to the normal operation mode. For example, in a case where a task for transmitting data to the counterpart device 120 is generated in the communication apparatus 300, or in a case where a task in which it is predicted that data can be transmitted to the counterpart device 120 is generated, the CPU 101 determines that the operation mode transitions to the normal operation mode. If the CPU 101 determines that the operation mode is to transition to the normal operation mode (YES in step S405), the processing proceeds to step S410. If the CPU 101 determines that the operation mode is not to transition to the normal operation mode (NO in step S405), the processing proceeds to step S406. The operation in step S405 is similar to the operation in step S204.

In step S406, the CPU 101 determines whether the interrupt signal 111 has been received. As described above, the timer 301 outputs the interrupt signal 111 to the CPU 101 upon lapse of the preliminarily set return period. If the CPU 101 determines that the interrupt signal 111 has been received (YES in step S406), the processing proceeds to step S407. In step S406, if the CPU 101 determines that the interrupt signal 111 has not been received (NO in step S406), the processing returns to step S405.

In step S407, the CPU 101 controls the clock control unit 103 to supply the physical layer 109 and the link control unit 108 with the clock signals 130 and 131, respectively. The processing proceeds to step S408.

In step S408, the link control unit 108 that is supplied with the clock signal 131 performs control processing for transitioning to the normal operation mode. The processing proceeds to step S409.

In step S409, the CPU 101 of the communication apparatus 300 communicates with the counterpart device 120 when the communication control unit 107 completes the transition to the normal operation mode and high-speed serial data communication between the physical layer 109 and the counterpart device 120 is enabled. After completion of the communication between the communication apparatus 300 and the counterpart device 120, the processing returns to step S402. In step S402, the CPU 101 controls the communication control unit 107 to transition to the power saving mode again.

Through the control processing described above, in a case where communication with the counterpart device 120 occurs at a predetermined time interval even when the communication apparatus 300 operates in the power saving mode, the sequence in which the operations of steps S406 to S409 are executed every return period corresponding to the predetermined time interval and then the processing returns to step S402 is executed. Accordingly, even during the operation in the power saving mode, the supply of clock signals can be resumed during a required period for communication with the counterpart device 120 and the supply of clock signals can be stopped in the other periods of time. This enhances the effect of reducing power consumption, while making it possible to implement periodic communication. Through the control processing described above, for example, in a case where the above-described communication with the counterpart device 120 repeatedly occurs at a predetermined time interval, there is no need to continuously supply clock signals to the physical layer 109 and the link control unit 108 during the operation in the power saving mode for preparation for communication that repeatedly occurs. Consequently, it is possible to establish a communication in response to a request from the counterpart device 120, while reducing power consumption in the communication apparatus 300 in the power saving mode.

In step S405, if the CPU 101 determines that the operation mode transitions to the normal operation mode (YES in step S405), the processing proceeds to step S410. In step S410, the CPU 101 controls the clock control unit 103 to supply the physical layer 109 and the link control unit 108 with the clock signals 130 and 131, respectively.

In step S411, the link control unit 108 performs control processing for transitioning to the normal operation mode in response to an instruction to return to the normal operation mode from the CPU 101. The link control unit 108 sends a notification indicating that the communication state returns to the normal operation mode to the counterpart device 120, thus resuming the high-speed serial data communication between the physical layer 109 and the counterpart device 120. Thus, the mode change control sequence is completed. The mode change control sequence is immediately resumed and repeated during the period in which the communication apparatus 300 operates in the normal operation mode.

According to the control processing described above, the communication apparatus 300 stops supply clock signals to unnecessary function blocks in the power saving mode in which communication is not performed, thus further reducing power consumption. Further, issuance of a notification about a timing when the counterpart device 120 performs communication to the CPU 101 from the timer 301 enables execution of the communication after clock signals are supplied to the communication control unit 107 to enable the communication between the communication apparatus 300 and the counterpart device 120. While the second example embodiment illustrates a typical configuration for high-speed serial data communication, the configuration according to the second example embodiment is not limited only to specific communication protocols and communication standards. For example, the configuration according to the second example embodiment may be applied to the PCIe standard.

A third example embodiment will be described below with reference to the drawings. The communication apparatus 300 according to the third example embodiment detects a time interval at which a temporal communication with the counterpart device 120 occurs, and determines a return period for supplying a clock signal. Accordingly, even in a case where the time period at which communication with the counterpart device 120 occurs is unknown, the return period can be set and the effect of reducing power consumption in the power saving mode can be enhanced.

In a mode change control sequence to be executed by the communication apparatus 300 according to the third example embodiment, the time interval at which communication with the counterpart device 120 occurs is detected after the operation mode of the communication control unit 107 transitions to the power saving mode, and the return period is set in the timer 301. After the supply of clock signals is stopped, a clock signal is then temporarily supplied using the interrupt signal 111 from the timer 301 based on the set return period, thus performing the communication with the counterpart device 120.

The configuration of the communication apparatus 300 according to the third example embodiment is similar to that of the communication apparatus 300 according to the second example embodiment.

Figure 5B:
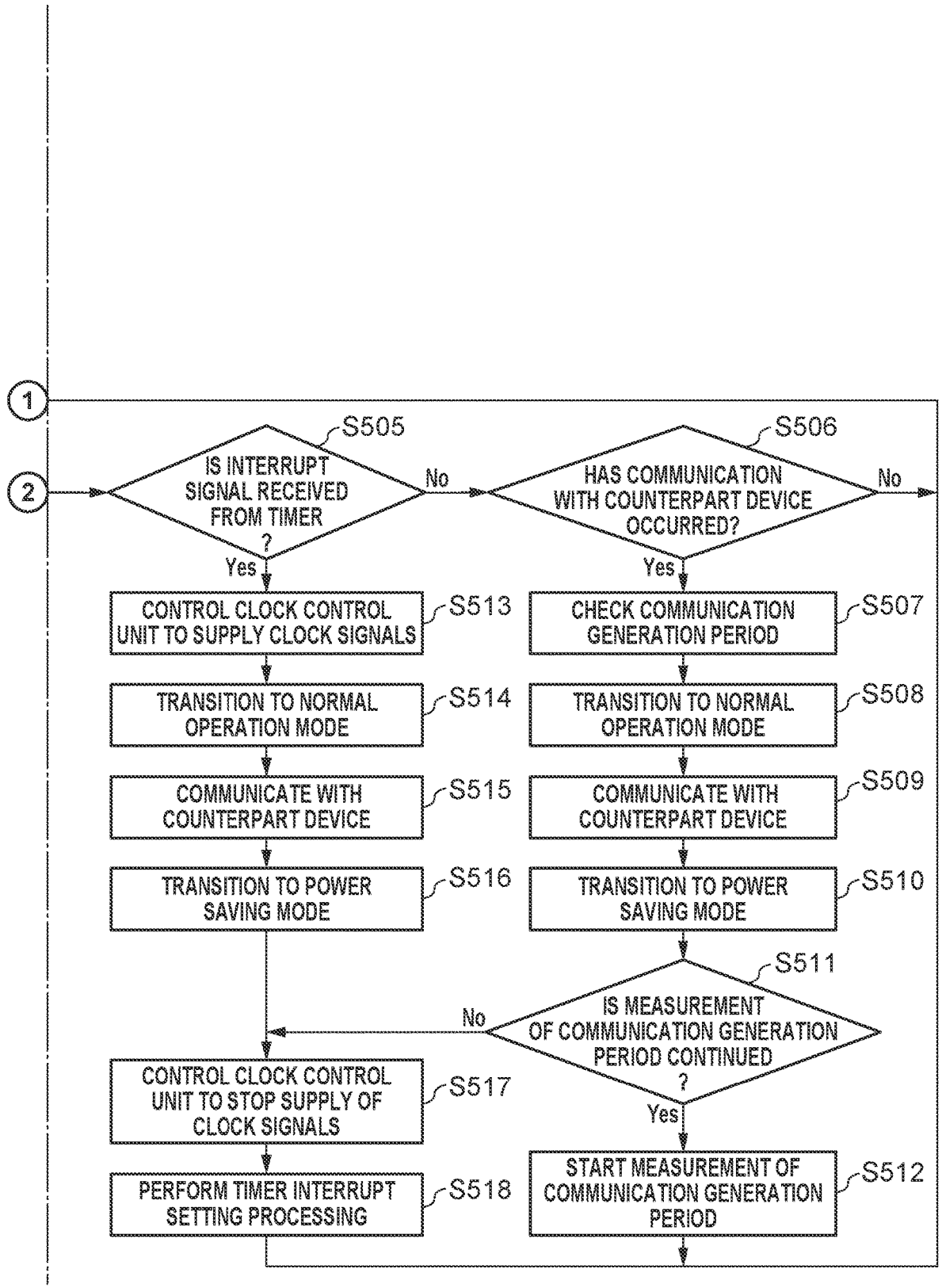
FIG. 5, composed of FIG. 5A and FIG. 5B, is a flowchart illustrating the sequence of operations for changing an operation mode of the communication control unit according to one example embodiment.

FIG. 5, composed of FIG. 5A and FIG. 5B, is a flowchart illustrating the mode change control sequence according to the third example embodiment.

Operation mode change control processing in the communication control unit 107 of the communication apparatus 300 and control processing for determining a predetermined time setting for supplying a clock signal based on a time interval at which communication between the communication apparatus 300 and the counterpart device 120 occurs will be described.

The mode change control sequence is repeatedly executed when the communication apparatus 300 operates in the normal operation mode in which normal data communication is performed in high-speed serial data communication between the physical layer 109 of the communication apparatus 300 and the counterpart device 120. In the mode change control sequence, the operation mode transitions from the normal operation mode to the power saving mode for reducing power consumption by shifting differential signals through transmission paths into an idle state, and then the operation mode returns to the normal operation mode.

The mode change control sequence is implemented by hardware modules included in the communication control unit 107 of the communication apparatus 300 being controlled and by the CPU 101 executing the processing based on system programs stored in the memory 106.

Figure 6:
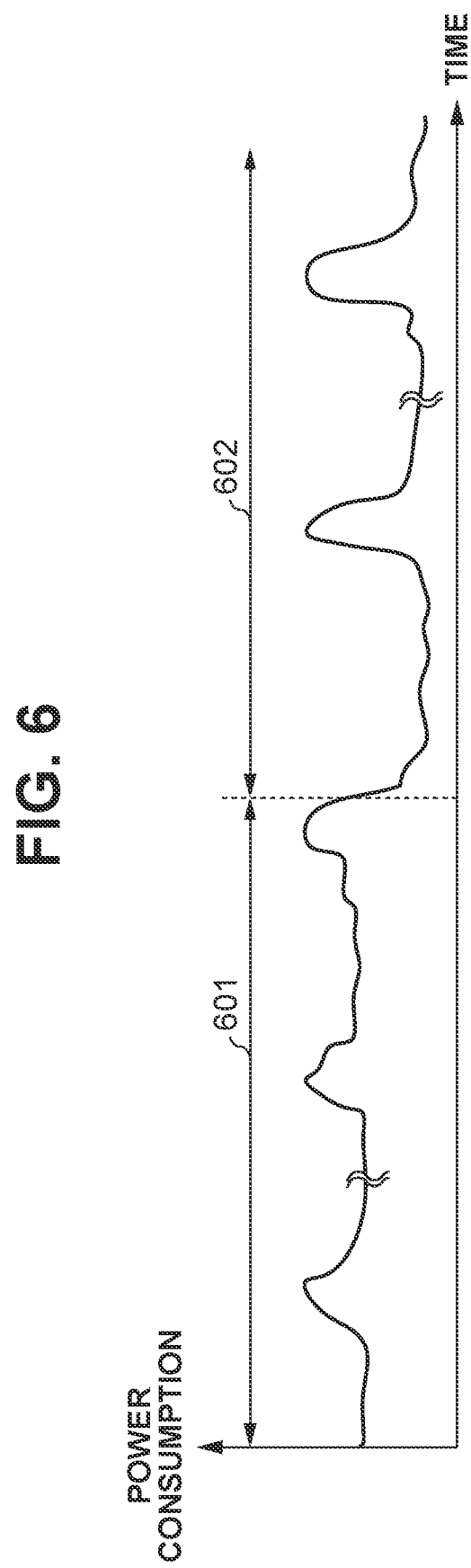
FIG. 6 is a timing diagram illustrating a relationship between the sequence of operations for changing an operation mode of the communication control unit and power consumption in the communication apparatus according to one example embodiment.

FIG. 6 is a timing diagram illustrating power consumption in the communication apparatus 300 that has executed the mode change control sequence according to the third example embodiment.

In step S501, the CPU 101 determines whether to transition to the power saving mode. For example, in a case where valid data communication between the communication control unit 107 and the counterpart device 120 has not occurred for a predetermined period of time, the CPU 101 determines that there is no need for constant communication and thus determines that the operation mode is to transition to the power saving mode.

In step S502, the link control unit 108 performs control processing for transitioning to the power saving mode. The link control unit 108 sends a notification indicating that the communication state is to transition to the power saving mode to the counterpart device 120, and shifts the transmission path between the physical layer 109 and the counterpart device 120 into the idle state for power saving.

In step S503, the CPU 101 controls the timer 301 to start the measurement by the timer 301. The CPU 101 acquires a time interval at which communication with the counterpart device 120 occurs based on the time measurement result from the timer 301.

In step S504, the CPU 101 determines whether to transition to the normal operation mode. If the CPU 101 determines that the operation mode returns to the normal operation mode (YES in step S504), the processing proceeds to step S519. If the power saving mode is maintained (NO in step S504), the processing proceeds to step S505.

In step S505, the CPU 101 determines whether the interrupt signal 111 has been received (interrupt occurs). In response to the return period set by the timer 301 having elapsed in a case where a timer interrupt has been set, the timer 301 outputs the interrupt signal 111 to the CPU 101. In response to receiving the interrupt signal 111, the CPU 101 determines that the interrupt occurs (YES in step S505), the processing proceeds to step S513, and then the processing proceeds to step S514 to perform interrupt processing for the CPU 101 to deal with the communication caused by the counterpart device 120. If the interrupt does not occur (NO in step S505), the processing proceeds to step S506.

In step S506, the CPU 101 determines whether communication with the counterpart device 120 has occurred. If the CPU 101 determines that the communication has occurred (YES in step S506), the processing proceeds to step S507. If the CPU 101 determines that the communication has not occurred (NO in step S506), the processing returns to the determination process in step S504.

In step S507, the CPU 101 reads out the elapsed time of the timer 301, which has started the measurement in step S503, and stores the elapsed time in the memory 106.

In step S508, the link control unit 108 performs control processing for returning to the normal operation mode.

In step S509, the communication apparatus 300 communicates with the counterpart device 120 in a state where the high-speed serial data communication between the physical layer 109 and the counterpart device 120 is enabled.

In step S510, after completion of the communication with the counterpart device 120, the communication apparatus 300 performs control processing for transitioning to the power saving mode again.

In step S511, the CPU 101 determines whether to continue the measurement of a communication generation period. If the time interval at which communication occurs can be measured a sufficient number of times to determine the time interval at which the communication with the counterpart device 120 occurs, the CPU 101 determines that there is no need to continue the measurement of the communication generation period. If the number of times of reading out the elapsed time of the timer 301 in step S508, in other words, the number of times of acquiring the time interval at which the communication with the counterpart device 120 occurs has reached a predetermined number of times, the CPU 101 determines that there is no need to continue the measurement of the communication generation period. The term "predetermined number of times" used herein may refer to any number of times sufficient to determine the time interval at which the communication with the counterpart device 120 occurs. The predetermined number of times is not particularly limited and is, for example, ten times or twenty times. The predetermined number of times may be desirably two or more times. If it is determined that there is no need to continue the measurement of the communication generation period (NO in step S511), the processing proceeds to step S517. If it is determined that there is a need to continue the measurement of the communication generation period (YES in step S511), the processing proceeds to step S512.

In step S512, as in step S503, the CPU 101 starts the measurement with the timer 301 so as to measure the time interval at which the communication with the counterpart device 120 occurs, and then the processing returns to the determination process in step S504. Thus, the communication apparatus 300 repeatedly performs a series of sequences as described above until the number of times of acquiring the time interval at which the communication with the counterpart device 120 occurs reaches two or more predetermined times. The predetermined number of times is two or more times. Specifically, the communication apparatus 300 executes the operations in steps S507 to S512 every time communication caused by the counterpart device 120 occurs in step S506.

A period 601 illustrated in FIG. 6 indicates power consumption in the communication apparatus 300 in the series of sequences.

If, in step S511, the CPU 101 determines that there is no need to continue the measurement of the communication generation period (NO in step S511), the processing proceeds to step S517. In step S517, the CPU 101 controls the clock control unit 103 to stop the supply of the clock signals 130 and 131 to the physical layer 109 and the link control unit 108, respectively. Thus, the communication control unit 107 stops the supply of the clock signals 130 and 131 to the physical layer 109 and the link control unit 108, respectively, in the power saving mode, thus enhancing the effect of further reducing power consumption.

In step S518, the CPU 101 sets the return period in which the communication apparatus 300 temporarily returns from the power saving mode to the normal operation mode in the timer 301, and starts the measurement by the timer 301. The processing then returns to step S504. The return period is determined based on the time interval at which the communication with the counterpart device 120 occurs and which is acquired a number of times in step S508. In this case, the CPU 101 operates as a setting unit that sets the return period.

For example, a value that is slightly smaller than the shortest time interval among the time intervals acquired a number of times is set to deal with the communication with the counterpart device 120, while enhancing the power saving effect. For example, in a case where a difference between the shortest time interval and the longest time interval among the time intervals acquired a number of times is large, a value with a large margin depending on the difference, i.e., a value that is much smaller than the acquired time interval may be set to reliably deal with the communication with the counterpart device 120. For example, a value obtained by subtracting the acquired difference between the longest time interval and the shortest time interval from the acquired shortest time interval can be set. In step S505, the CPU 101 determines whether an interrupt occurs based on whether the interrupt signal 111 output from the timer 301 has been received by the CPU 101 in response to the elapsed time set in the timer 301 having passed in step S519.

In step S513, the CPU 101 controls the clock control unit 103 to supply the physical layer 109 and the link control unit 108 with the clock signals 130 and 131, respectively.

In step S514, the link control unit 108 that is supplied with the clock signal 131 performs control processing for returning to the normal operation mode.

In step S515, the communication apparatus 300 communicates with the counterpart device 120 in a state where the high-speed serial data communication between the physical layer 109 and the counterpart device 120 is enabled.

In step S516, in response to completion of the communication with the counterpart device 120, the communication apparatus 300 controls the communication control unit 107 to transition to the power saving mode again. Thus, in such a case where the communication with the counterpart device 120 occurs at a predetermined time interval in the power saving mode in which the supply of clock signals is stopped, the communication apparatus 300 repeatedly performs the series of sequences. In other words, the communication apparatus 300 executes the operations in steps S513 to S518 every time an interrupt from the timer 301 occurs in step S505.

A period 602 illustrated in FIG. 6 indicates power consumption in the communication apparatus 300 in the series of sequences.

In step S504, for example, in a case where there is a need to resume the constant communication between the communication apparatus 300 and the counterpart device 120, if the CPU 101 determines that the operation mode is to return to the normal operation mode (YES in step S504), the processing proceeds to step S519. In step S519, the CPU 101 determines whether the clock signals 130 and 131 are supplied to the physical layer 109 and the link control unit 108, respectively. In the power saving mode of the communication apparatus 300 according to the third example embodiment, the situation where clock signals are supplied to the communication control unit 107 varies depending on whether the control processing for stopping the supply of clock signals is performed in step S517.

If the supply of clock signals to the communication control unit 107 is stopped (YES in step S519), the processing proceeds to step S520. If clock signals are supplied to the communication control unit 107 (NO in step S519), the processing proceeds to step S521.

In step S520, the CPU 101 controls the clock control unit 103 to supply the physical layer 109 and the link control unit 108 with the clock signals 130 and 131, respectively.

In step S521, the link control unit 108 performs control processing for transitioning to the normal operation mode in response to an instruction to return to the normal operation mode from the CPU 101. The link control unit 108 sends a notification indicating that the communication state returns to the normal operation mode to the counterpart device 120, thereby resuming the high-speed serial data communication between the physical layer 109 and the counterpart device 120. Thus, the mode change control sequence is completed.

According to the control processing described above, the communication apparatus 300 stops the supply of clock signals to unnecessary function blocks in the power waving mode in which communication is not performed, thus further reducing power consumption.

As illustrated in FIG. 6, the mode change control sequence according to the third example embodiment includes a sequence of operations for detecting a time interval at which communication with the counterpart device 120 occurs in the power saving mode. The mode change control sequence also includes a sequence in which the return period is set based on the detected time interval, a clock signal is generated based on the return period after the supply of the clock signal is stopped, and executes the communication with the counterpart device 120. Therefore, the communication apparatus 300 can achieve effective power saving even in a case where a predetermined time setting for supplying clock signals is not made in advance.

While the third example embodiment illustrates a typical configuration for high-speed serial data communication, the configuration according to the third example embodiment is not limited only to specific communication protocols and communication standards. For example, the configuration according to the third example embodiment may be applied to communication based on the PCIe standard. As for operation of the communication apparatus 300, control processing for immediately stopping the supply of clock signals in the subsequent transition to the power saving mode may be performed based on the return period set in the first transition to the power saving mode.

Other Embodiments

The above-described embodiments can also be realized by a computer of a system or apparatus that reads out and executes computer executable instructions (e.g., one or more programs) stored in a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While various embodiments of the disclosure are described with reference to example embodiments, it is to be understood that the aspects of the disclosure are not limited to the example embodiments. The scope of the following claims is to be accorded the broadest interpretation so as to encompass all such modifications and equivalent structures.

This application claims the benefit of Japanese Patent Application No. 2021-033659, filed Mar. 3, 2021, which is hereby incorporated by reference herein in its entirety.

What is claimed is:

1. A communication apparatus comprising:
   a communication circuit which operates to communicate with an external apparatus;
   a clock supply circuit;
   a CPU; and
   a memory storing a program which, when executed by the CPU, causes the communication apparatus to function as:
   a control unit configured to cause the communication circuit to operate in any one of a plurality of modes including a first mode and a second mode, the first mode being a mode in which the communication circuit performs a normal communication with the external apparatus, the second mode being a mode in which the communication circuit operates with lower power consumption than in the first mode, wherein, in a case where the communication circuit operates in the second mode, the control unit controls the clock supply circuit so as not to supply a clock signal to the communication circuit, and wherein, while the communication circuit is operating in the second mode and the clock signal is not being supplied to the communication circuit, the control unit controls the clock supply circuit to start supply of the clock signal to the communication circuit in response to receiving a predetermined signal; and a measurement unit configured to output the predetermined signal to the control unit in response to lapse of a return period having been set.

2. The communication apparatus according to claim 1, wherein the control unit measures a time interval at which communication between the external apparatus and the communication circuit occurs during a period in which the communication circuit operates in the second mode, and to sets the return period based on the measured time interval.

3. The communication apparatus according to claim 2, wherein the control unit acquires, two or more predetermined times, the time interval at which communication between the external apparatus and the communication circuit occurs during the period in which the communication circuit operates in the second mode, and the control unit uses a value smaller than a shortest time interval among the acquired time intervals.

4. The communication apparatus according to claim 3, wherein, in a case where the control unit acquires, two or more predetermined times, the time interval at which communication between the external apparatus and the communication circuit occurs during the period in which the communication circuit operates in the second mode and a difference between a longest time interval and a shortest time interval among the acquired time intervals is larger than a predetermined value, the control unit uses, as the return period, a value smaller than the shortest time interval based on the difference.

5. The communication apparatus according to claim 1, wherein the communication circuit complies with a Peripheral Component Interconnect (PCI) Express standard.

6. The communication apparatus according to claim 1, wherein the communication circuit includes a physical layer which exchanges signals with the external apparatus and a link controller which communicates data with the memory and the physical layer, and the control unit controls the clock supply circuit so as not to supply the clock signal to the physical layer and the link controller in a case where the communication circuit operates in the second mode.

7. The communication apparatus according to claim 6, wherein the physical layer exchanges the signals with the external apparatus by a differential transmission of serial data, and shifts differential signals through transmission paths into an idle state in the second mode.

8. A method comprising:

causing a communication unit of a communication apparatus to operate in any one of a plurality of modes including a first mode and a second mode, the first operation mode being a mode in which the communication unit performs a normal communication with an external apparatus, the second mode being a mode in which the communication unit operates with lower power consumption than in the first mode;

controlling, in a case where the communication unit operates in the second operation mode, a supply unit of the communication apparatus so as not to supply a clock signal to the communication unit;

controlling the supply unit to start supply of the clock signal to the communication unit in response to receiving a predetermined signal while the communication unit is operating in the second mode and the clock signal is not being supplied to the communication unit; and outputting the predetermined signal in response to lapse of a return period having been set.

9. A non-transitory storage medium that stores a program causing a computer to execute a method, the method comprising:

causing a communication unit of a communication apparatus to operate in any one of a plurality of modes including a first mode and a second mode, the first mode being a mode in which the communication unit performs a normal communication with an external apparatus, the second mode being a mode in which the communication unit operates with lower power consumption than in the first mode;

controlling, in a case where the communication unit operates in the second mode, a supply unit of the communication apparatus so as not to supply a clock signal to the communication unit;

controlling the supply unit to start supply of the clock signal to the communication unit in response to receiving a predetermined signal while the communication unit is operating in the second mode and the clock signal is not being supplied to the communication unit; and outputting the predetermined signal in response to lapse of a return period having been set.

* * * * *